March 18, 1969
D. E. KOHLS ET AL
3,433,315
METHOD AND APPARATUS FOR HANDLING BULK CEMENT
Filed Nov. 2, 1966
Sheet 1 of 2
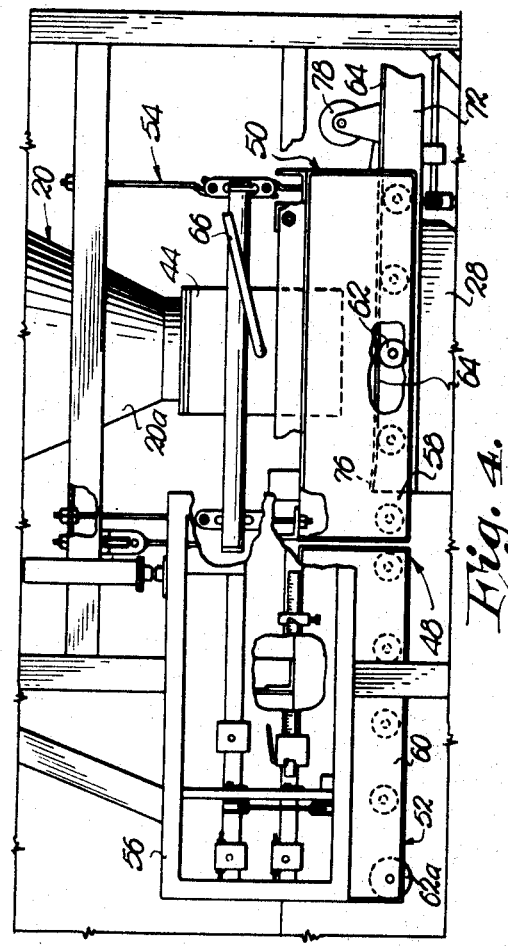
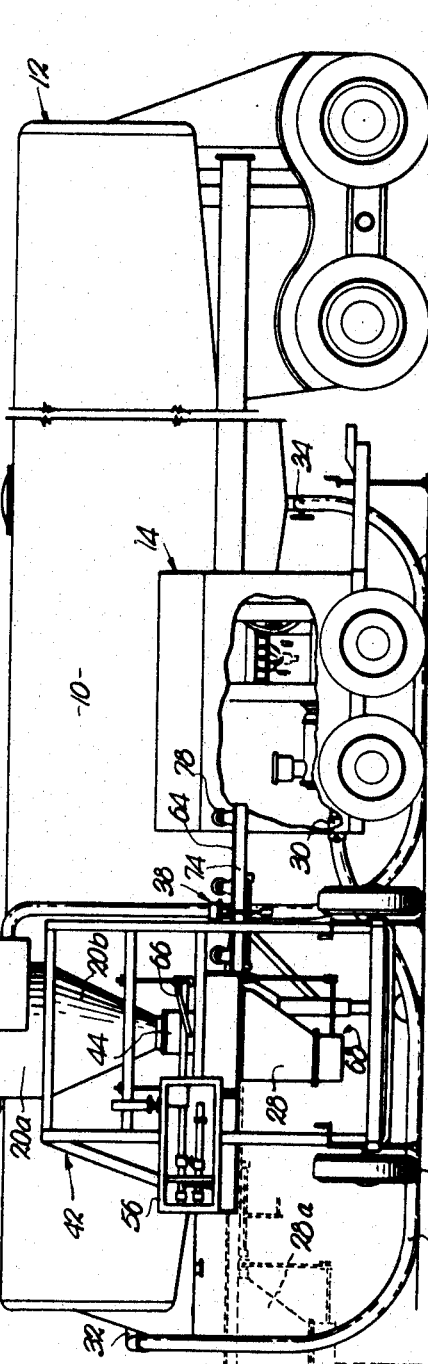
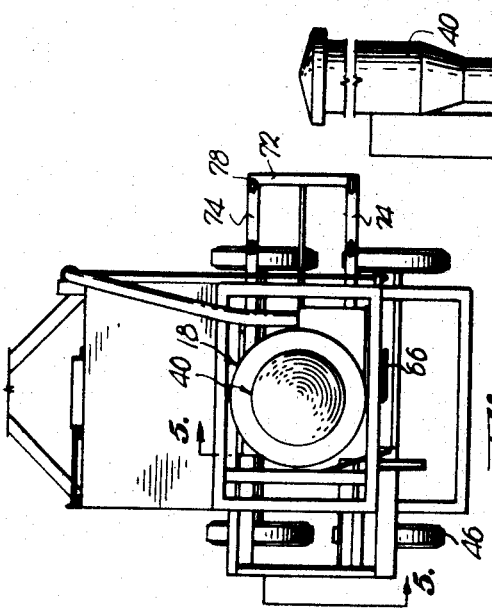
INVENTORS
Dennis E. Kohls
Donald L. Moe
Harry W. Reece
BY
*Harry, Schmidt, Johnson & Hovey*
ATTORNEYS

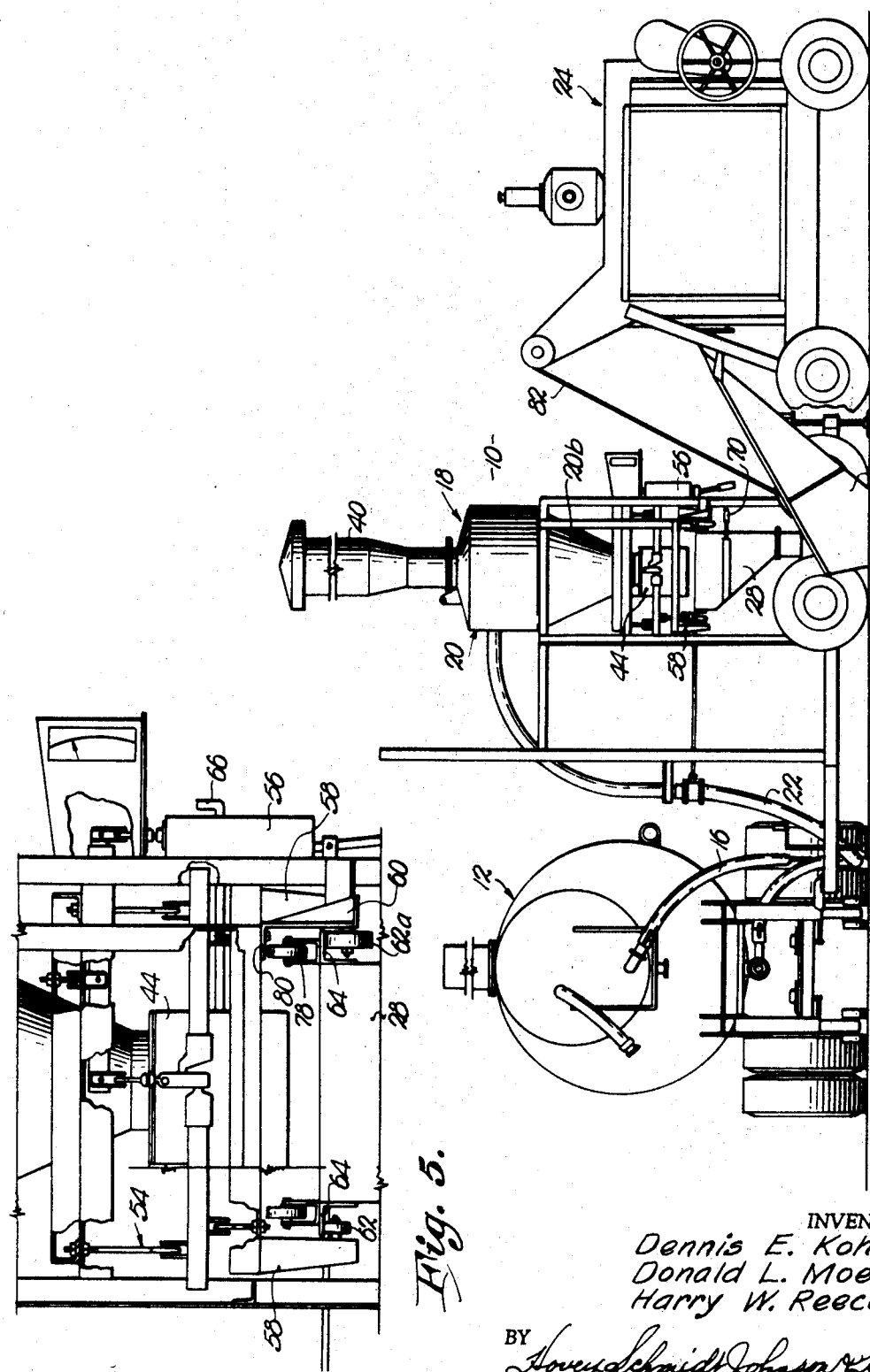

United States Patent Office 3,433,315
Patented Mar. 18, 1969

3,433,315
METHOD AND APPARATUS FOR HANDLING BULK CEMENT
Dennis E. Kohls, Salina, Donald L. Moe, Topeka, and Harry W. Reece, Scandia, Kans., assignors to Reece Construction Co., Inc., Scandia, Kans., a corporation of Kansas
Filed Nov. 2, 1966, Ser. No. 591,575
U.S. Cl. 177—151          2 Claims
Int. Cl. G01g 23/02

ABSTRACT OF THE DISCLOSURE

Method and apparatus for handling cement in bulk form wherein the cement is delivered from a closed container under fluid pressure into an accumulator for subsequent delivery to a weighing hopper, which hopper is shiftable from its weighing position to a position for discharging the cement therefrom into a cement mixer. The hopper is shiftably carried by track structure having a live portion coupled with the weighing scale and a dead portion extending from the live portion to the discharge position, the dead portion supporting the hopper in cantilevered relationship when the hopper is at the discharge position.

---

Often, it is economical for contractors to produce concrete, in small portions, at the jobsite. Manifestly, because of the nature of concrete, the amount of cement for a given portion of concrete must be closely regulated. Cement, of course, may be purchased in bags of preselected sizes. However, the same must then be handled manually. Additionally, if the portion of concrete to be produced does not require an amount of concrete equal to a whole number multiple of the amount in one bag, guesswork must be relied upon.

Bulk cement, although the same is less expensive than packaged cement, has not been used in the past for such operation because of the inherent handling difficulties. Furthermore, the cement must be accurately subdivided into batches of predetermined sizes and it was thought that weighing equipment could not be constructed which would be transportable from site-to-site and at the same time be capable of weighing a large enough batch of cement to satisfy the requirements of a substantial portion of concrete.

Therefore, it is the primary object of the instant invention to provide apparatus for handling and weighing bulk cement wherein the physical dimensions of the same are minimized to the end that the apparatus is readily transportable from jobsite to jobsite, thereby maximizing the utility of the same.

A very important object of the instant invention is to provide such apparatus wherein the cement is successively divided into a plurality of weighed batches through the use of mechanism operable to receive a batch of cement from an overhead source, weigh the same, and then deliver the batch for dispensing at a location remote from the scale, whereby the dispensing is accomplished efficiently and expeditiously without interference from the support for the scale.

Another very important object of the invention is to provide such mechanism where in the weighed batches are movable on the support from a centralized location to a delivery position where they are supported in cantilevered relationship with respect to the support so that the overall dimensions of the latter are minimized and yet the weighed batches are dispensed at a location spaced from the support.

Yet a further important object of the present invention is the provision of such mechanism wherein the batch of cement being weighed is supported solely by structure linked with the scale and centered within the support during the weighing operation and is transferable therefrom to a position for subsequent delivery without interfering with the scale linkage.

Still another important object of the instant invention is the provision of a method for handling bulk cement including the removal of the same from a closed container by mechanical means and without the necessity of manual operations whereby said removal is efficiently and expeditiously accomplished.

A very important aim of the invention is the provision of such a method wherein the cement is mechanically subdivided into a succession of weighed batches, thereby facilitating the further use of the cement.

In the drawings:

FIGURE 1 is a side elevational view of material-handling apparatus embodying the concepts and principles of the instant invention and including a bulk cement transport trailer, a compressor for forcing high velocity air through the trailer, and a cement batching assembly;

FIG. 2 is an end view of the apparatus illustrated in FIG. 1 wherein the compressor has been deleted for increased clarity and a cement mixer has been added for a greater understanding of the utility of the apparatus;

FIG. 3 is a top plan view of the cement batching apparatus illustrated in FIG. 1;

FIG. 4 is an enlarged, detail view of the central portion of the batching apparatus illustrated in FIG. 1; and FIG. 5 is an enlarged, detail view of the central portion of the batching apparatus illustrated in FIG. 2, and in this respect, it is to be understood that FIG. 5, as well as the batching apparatus illustrated in FIG. 2, are partially in cross section having been taken along line 5—5 of FIG. 3.

Material handling apparatus embodying the concepts and principles of the instant invention is illustrated in FIGS. 1 and 2 and is broadly designated by the numeral 10. Apparatus 10 includes a closed container of bulk cement in the nature of a transport trailer 12 of the type well known to those skilled in the art and an air compressor 14 communicating with trailer 12 through a flexible conduit 16.

Apparatus 10 also includes a cement batching assembly 18 including an accumulator section 20 which communicates with trailer 12 through a flexible hose 22 and a cement mixer 24 for receiving a batch of cement from assembly 18. In this respect, it is to be understood that the swingable chute 26 of mixer 24 underlies the hopper 28 of assembly 18 when hopper 28 has been moved to the dashed line position thereof illustrated in FIG. 1 and designated by the numeral 28a. It can be seen viewing FIG. 1 that conduit 16 extends between the discharge 30 of compressor 14 and the air inlet 32 of trailer 12. Similarly, hose 22 extends between the outlet 34 of trailer 12 and the inlet structure 36 of accumulator 20. A valve 38 is provided in hose 22 for selectively intercommunicating structure 36 and outlet 34.

Structure 36 is disposed to project fluid traveling through hose 22 from trailer 12 in a direction tangentially of accumulator 20. It is to be understood that portion 20a is in the nature of a cyclonic separator and presents a zone of discharge wherein the velocity of fluid from hose 22 is decreased whereby solids therein will gravitate into the lower truncated cone-shaped portion 20b of accumulator 20 while the remainder of the fluid escapes to the atmosphere through vent 40.

It can be seen, viewing FIGS. 1, 2 and 3, that assembly 18 includes a support 42 which mounts accumulator 20, and a valve 44 is provided at the lower end of portion 20b. Support 42 is provided with a number of ground-engaging wheels 46 adapting the support for movement.

Support 42 carries track-defining structure 48 comprising a live portion 50 and a dead portion 52. Live portion 50 is suspended from linkage 54 centered beneath accumulator 20 as can best be seen viewing FIG. 4, and linkage 54 is coupled with a scale 56 mounted on support 42 in a manner such that the application of a downwardly directed force on portion 50 actuates scale 56. Portion 50 of structure 48 comprises a pair of opposed panels 58 disposed on opposite sides of hopper 28 as can be seen viewing FIG. 5. Likewise, portion 52 of structure 48 comprises a pair of spaced-apart, elongated, opposed, transversely Z-shaped member 60 which are also disposed on opposite sides of hopper 28. Viewing FIG. 5, because of the disposition of the section line, the member on the left hand side of hopper 28 does not appear; however, that member is identical with the member shown except for the fact that it is a mirror image thereof. Panels 58 and members 60 are provided with a plurality of aligned, stationary rollers 62 which are best illustrated in FIG. 4. All of the rollers 62 are substantially identical in configuration except for the rollers 62a at the left-hand ends of each member 60, the rollers 62a being somewhat larger in diameter than the remainder of the rollers 62.

Viewing FIG. 5, it can be seen that hopper 28 is provided with roller-engaging shoulder means in the nature of a pair of flanges 64 extending outwardly from opposite sides of hopper 28 at the upper edges thereof. Flanges 64 are engaged with rollers 62 and support hopper 28 therebelow. It is to be understood that hopper 28 is normally disposed beneath valve 44 for receiving material therefrom upon actuation of valve 44 through the handle 66 of the latter. Hopper 28 is provided with valve mechansim 68 at the lower end thereof which is actuated by a handle 70 for dispensing material from hopper 28 onto chute 26.

Hopper 28 is provided with an extension 72 extending rightwardly therefrom. Viewing FIG. 3, it can be seen that extension 72 includes a pair of spaced-apart, opposed side elements 74 which extend rightwardly in parallelism with opposite sides of hopper 28. In this respect, it can be seen viewing FIGS. 1 and 4 respectively, that flanges 64 extend rightwardly along the entire lengths of elements 74. Thus, hopper 28 is movable along rollers 62 and, in this respect, flanges 64 are provided with upturned lips 76 at the left-hand end of flanges 64 to preclude binding between the latter and rollers 62 as hopper 28 is moved leftwardly (FIG. 4).

A plurality of wheels 78 are positioned on each element 74 as can best be seen viewing FIGS. 1 and 3. When hopper 28 is shifted into the dashed-line position thereof, indicated by the numeral 28a in FIG. 1, wheels 78 are disposed beneath the inturned rail portions 80 of members 60. This disposition is best illustrated in FIG. 5 wherein it can also be seen that rollers 62a underlie flanges 64 at the right-hand end (FIG. 1) of elements 74. The weight of hopper 28 tends to cause the same to move downwardly; however, the fulcrum presented by the engagement between rollers 62a and flanges 64 cause wheels 78 to move upwardly into engagement with rails 80. Thus, hopper 28 is supported in cantilevered relationship with respect to support 42 at a position clearing the latter and scale linkage 54. From the foregoing description it can be seen that hopper 28 and the extension 72 thereon, along with structure 48, present mechanism for supporting a batch of material while the same is being weighed and for transporting the weighed material to a position clearing scale 56 for subsequent unimpeded dispensing of the weighed batch.

In operation, compressor 14 forces pressurized air at high velocity into trailer 12 to fluidize the cement therein and thereby render the same buoyant in the air. Thereafter, the high velocity air, along with the fluidized cement entrained therein, is directed along hose 22 and into inlet structure 36 of accumulator section 20a where the velocity of the air is decreased whereby the cement separates from the air by gravitational flow. The gravitating cement is accumulated in section 20b of accumulator 20. In this respect, it is to be understood that valve 44 is normally closed.

Hopper 28 normally underlies valve 44 as is indicated by the solid line showing of the same in FIG. 1. Whenever it is desired to subdivide the cement accumulated in portion 20b into a batch corresponding in size to the portion of concrete to be produced, valve 44 is opened by manipulating handle 66 thereof, whereupon cement gravitates into hopper 28. Cement is collected in hopper 28 until scale 56 indicates that an appropriate amount has been accumulated. Valve 44 is then closed and thereafter hopper 28 is moved along rollers 62 and into the dashed-line position indicated by the numeral 28a in FIG. 1. At this time, hopper 28 overlies chute 26 and, upon manipulation of valve mechanism 68, the weighed batch is discharged in chute 26. Upon return of the hopper 28 to the solid-line position illustrated in FIG. 1, chute 26 is elevated by cable 82 and the cement therein is caused to move into mixer 24 in a manner well known to those skilled in the art.

Manifestly, the novel structure of hopper 28 and structure 48 cooperate to present a cement batching assembly having minimum dimensions. This is of particular importance in view of the fact that assembly 18 is preferably transportable. It is desirable that hopper 28 be normally disposed at a minimum height so that the overall height of assembly 18 is correspondingly held to a minimum. Furthermore, support 42 must include adequate bracing to not only support assembly 18 in a stationary position, but to also permit the same to be moved rapidly to a different locality.

The novel principles of the instant invention, by facilitating the supporting of hopper 28 in a cantilevered position, permit the minimization of the overall size of assembly 18 and the sturdy construction of the same. It can be seen that support 42 does not interfere with the operation of hopper 28 to dispense a batch of cement onto chute 26. Additionally, when hopper 28 is in the position 28a thereof, hopper 28 is supported in a manner such that during the dispensing of cement therefrom, scale 56 and the intricate linkage 54 thereof are not subjected to unnecessary forces which could disturb the calibration of scale 56.

Manifestly, the principles of the instant invention permit the handling of bulk cement and the subdividing of the same into batches of predetermined size in a manner previously unknown to the construction industry.

Having thus described the invention, what is claimed as new and desired to be secured by Letters Patent is:

1. In material handling apparatus:
   a support;
   a scale for weighing said material; and
   mechanism for supporting a batch of the material while the same is being weighed and for transporting the weighed batch of material to a position clearing said scale for subsequent unimpeded dispensing of the weighed batch,
   said mechanism including elongated track defining structure carried by said support,
   said structure having a live portion adjacent the scale and coupled with the latter for actuating the scale upon application of a downwardly directed force on said live portion and a dead portion extending from said live portion toward said position,
   said mechanism having a material receiving and dispensing hopper normally supported solely by said live portion during said weighing of the batch whereby the weight of the latter exerts a downwardly directed force on the live structure to actuate the scale,
   said hopper being shiftable along said structure to said position where the hopper is supported solely by said dead portion for dispensing unimpeded by said support, said dead portion including rail means engageable with the hopper and supporting the latter in cantilevered relationship when the hopper is at said position.

2. The invention of claim 1, wherein said hopper includes an extension extending toward said support when the hopper is at said position, there being means on said extension disposed beneath said rail means and means on said dead portion disposed beneath the extension when the hopper is in said position, said means on the extension being engageable with said rail means and said means on the dead portion being engageable with said extension for counteracting the gravitational forces of said hopper whereby the latter is maintained in said cantilevered relationship.

References Cited

UNITED STATES PATENTS

| | | | |
|---|---|---|---|
| 92,083 | 6/1869 | Morrison | 177—152 |
| 2,793,024 | 5/1957 | Rose et al. | 177—163 X |
| 3,162,316 | 12/1964 | Camp | 214—2 |
| 3,285,295 | 11/1966 | Titchenal et al. | 302—29 |
| 3,311,418 | 3/1967 | Scruby et al. | 302—3 |

RICHARD B. WILKINSON, *Primary Examiner.*

G. H. MILLER, JR., *Assistant Examiner.*

U.S. Cl. X.R.

214—2